US010332044B1

(12) United States Patent
Clover et al.

(10) Patent No.: US 10,332,044 B1
(45) Date of Patent: Jun. 25, 2019

(54) METHOD AND SYSTEM FOR AUTOMATICALLY PRESCRIBING PERFORMANCE GOALS TO USERS IN A HUMAN RESOURCES ENVIRONMENT

(75) Inventors: Melinda K. Clover, Redwood City, CA (US); Jodie Kalikow, Westford, MA (US); Gaurav Mehra, Maharashtra (IN)

(73) Assignee: SABA SOFTWARE, INC., Redwood Shores, CA (US)

( * ) Notice: Subject to any disclaimer, the term of this patent is extended or adjusted under 35 U.S.C. 154(b) by 2045 days.

(21) Appl. No.: 11/214,760

(22) Filed: Aug. 29, 2005

Related U.S. Application Data

(60) Provisional application No. 60/605,360, filed on Aug. 27, 2004.

(51) Int. Cl.
  *G06Q 10/00* (2012.01)
  *G06Q 10/06* (2012.01)

(52) U.S. Cl.
  CPC ..... *G06Q 10/063* (2013.01); *G06Q 10/06398* (2013.01); *G06Q 10/0639* (2013.01); *G06Q 10/06393* (2013.01)

(58) Field of Classification Search
  CPC ............. G06Q 10/063; G06Q 10/0639; G06Q 10/06393; G06Q 10/06398
  See application file for complete search history.

(56) References Cited

U.S. PATENT DOCUMENTS

| | | | |
|---|---|---|---|
| 6,405,226 B1 * | 6/2002 | Alpert et al. | 715/206 |
| 6,606,480 B1 * | 8/2003 | L'Allier et al. | 434/362 |
| 7,395,316 B2 | 7/2008 | Ostertag et al. | |
| 2002/0055089 A1 * | 5/2002 | Scheirer | 434/350 |
| 2003/0044762 A1 | 3/2003 | Bergan et al. | |
| 2003/0158766 A1 * | 8/2003 | Mital et al. | 705/7 |
| 2003/0229529 A1 * | 12/2003 | Mui et al. | 705/8 |
| 2004/0215503 A1 * | 10/2004 | Allpress et al. | 705/11 |
| 2007/0129953 A1 * | 6/2007 | Cunningham et al. | 705/1 |

OTHER PUBLICATIONS

Banker, Rajiv and Kemerer, Chris. Performance Evaluation Metrics for Information Systems Development: A Principal-Agent Model. Information Systems Research 3:4, The Institute of Management Sciences. (Year: 1992).*
Sue-Chan, Christina and Ong, Mark. Goal Assigning and Performance: Assessing the mediating roles of goal commitment and self-efficacy and the moderating role of power distance. Organizational Behavior and Human Decision Processes 89, pp. 1140-1161. (Year: 2002).*

* cited by examiner

*Primary Examiner* — Stephanie Z Delich

(57) ABSTRACT

A method and system for automatically implementing performance goals in a human resources environment. Specifically, the method provides a first interface for defining performance goals. Thereafter, a definition of a performance goal is received via the first interface. The method also provides a second interface for identifying an assigned group comprising users to be prescribed the performance goal. Thereafter, criteria is received via the second interface that identifies the assigned group. The method searches a database to identify users in the assigned group based on the criteria in order to apply the prescriptive rule. Then, the performance goal is prescribed to users in the assigned group.

8 Claims, 10 Drawing Sheets

500

| Address: | http://localhost:applicationserver . . . | 510 |

NEW PRESCRIPTIVE RULE: DEFINITION — 520

1. Rule Details  2. User Criteria  3. Requirements
4. Preview  5. Activate — 525

Name — Performance Goal 1 — 530

Description — Increase Global Sales by 20 % — 540

Domain — World — 550

Member List Update Frequency:
○ Hourly
○ Daily
● Weekly — 560

Custom Fields

Custom0 — 570

Custom1 — 575

| Address | http://localhost:applicationserver ... | ~ 610

620 ~ PRESCRIPTIVE RULE DETAILS: CRITERIA

525 ~ 1. Rule Details  2. User Criteria  3. Requirements
4. Preview  5. Activate User Information ~ 630

☐ Type ~ 631
☐ Status ~ 632
☐ Start Date After ~ 633
☐ Start Date Before ~ 634
☐ Country ~ 635
☐ Manager ~ 636
☐ Domain ~ 637
☐ Location ~ 638
☐ Other Information ~ 639

Job and Role Information ~ 640

647 ~ ☑ Job        | Sales Groups |
         ☐ Role              ~ 649

| | Weight | Source | Target Start Date | Target End Date | Actual End Date | Status | Action |
|---|---|---|---|---|---|---|---|
| Goal 1 | 50 % | Manager | 06/01/05 | 12/31/05 | 10/31/05 | Complete (100 %) | |
| Goal 2 | 20 % | Organization | 02/01/05 | 03/31/06 | | On Track (40 %) | |
| Goal 3 | 30 % | Self | 010/01/05 | 12/31/05 | | Needs Attention | |

| Assignee 810 | Goal Statement 820 | Goal Type 830 | Target Start Date 840 | Target End Date 850 | Actual End Date 860 | Status 870 |
|---|---|---|---|---|---|---|
| Ginny Grant | Create 2 White Papers to Entice Potential Buyers | Revenue | 06/01/05 | 12/31/05 | 10/31/05 | Complete (100 %) |
| Brook Manville | Create Functional Specification for Project A | Process | 02/01/05 | 03/31/06 | | On Track (40 %) |
| Simon Jonas | Develop Marketing Messages Strategy | Process | 010/01/05 | 12/31/05 | | Needs Attention |

Fig. 8

METHOD AND SYSTEM FOR AUTOMATICALLY PRESCRIBING PERFORMANCE GOALS TO USERS IN A HUMAN RESOURCES ENVIRONMENT

RELATED PROVISIONAL U.S. APPLICATION

This application claims priority to the provisional patent application, Ser. No. 60/605,360, entitled "Prescriptive Engine Learning and Performance," with filing date Aug. 27, 2004, and assigned to the assignee of the present invention, which is herein incorporated by reference in its entirety.

RELATED U.S. APPLICATION

This application is related to the co-pending patent application, Ser. No. 11/214,762, entitled "Method and System for Automatically Prescribing Learning Requirements to Users in a Human Resources Environment," with filing date Aug. 29, 2005, and assigned to the assignee of the present invention, which is herein incorporated by reference in its entirety.

BACKGROUND OF THE INVENTION

Field of the Invention

Embodiments of the present invention relate to the field of human capital development and management. More particularly, embodiments of the present invention relate generally to automatically assigning performance goals to targeted users.

Related Art

Global competition, the knowledge revolution and the growing expectations for performance drive every organization to achieve more effective and efficient learning. This leads to productive development and management of its human capital. As a result, a major focus for corporations in recent years has been to reduce costs on a program basis to bring tighter alignment between skill building programs and business objectives managed via learning management systems.

Over the last several years, as human capital development and management has become more strategic, organizations' human capital processes are more systematically governed. Leading organizations increasingly pursue recruiting and performance management on a well planned and monitored global basis. This establishes coordinated processes for hiring, retention, and assessing and rewarding performance of employees.

In particular, organizations that have undertaken a formal business performance improvement effort require that management and employees define and align their goals that will be achieved over a particular period of time. When productivity needs to be improved in a particular area of the organization, it is often these roles-based or process-oriented goals that are analyzed and adjusted to produce required results.

However, most human resource systems only focus on organizational or managerial relationships, and are not geared for assigning performance goals to individuals. Specifically, many organizations today have little or no systems of applying performance goals to individuals of a corporation, either on an individual or enterprise-wide basis. Rather, the organization and managerial relationships focus on evaluating the past performance of individuals and groups within a corporation, instead of focusing on what these individuals and groups should achieve.

As such, in most organizations, human resource functions and processes are relatively independent and largely disconnected from the assignment of performance goals. That is, goal oriented objectives tend to lag behind the more established processes of hiring, retention and assessing performance of employees.

SUMMARY OF THE INVENTION

A method and system for automatically implementing performance goals in a human resources environment. Specifically, the method provides a first interface for defining performance goals. Thereafter, a definition of a performance goal is received via the first interface. The method also provides a second interface for identifying an assigned group comprising users to be prescribed the performance goal. Thereafter, criteria is received via the second interface that identifies the assigned group. The method searches a database to identify users in the assigned group based on the criteria in order to apply the prescriptive rule. Then, the performance goal is prescribed to users in the assigned group.

In accordance with another embodiment of the present invention, a method of prescribing performance goals to individuals is disclosed. The method begins by defining a prescriptive rule. The prescriptive rule is defined by specifying criteria that defines at least one user targeted by the prescriptive rule. These users are targeted from a plurality of users that are defined in a relational database. For instance, the relational database includes personal attributes describing each of a plurality of users stored in the relational database. As such, the criteria defines a set of common attributes that are associated with the targeted users. In addition, the prescriptive rule is defined by defining at least one performance goal that is to be prescribed to the targeted users. The prescriptive rule is automatically applied to the relational database to prescribe the at least one performance goal to the users that are targeted by the prescriptive rule.

BRIEF DESCRIPTION OF THE DRAWINGS

FIG. 5 is a screen shot illustrating the definition of a prescriptive rule, in accordance with one embodiment of the present invention.

FIG. 6 is a screen shot illustrating the selection criteria that define the users targeted for the prescription of performance goals, in accordance with one embodiment of the present invention.

FIG. 7 is an action plan 700 illustrating the attachment of the performance goals to an action plan associated with a targeted user, in accordance with one embodiment of the present invention.

FIG. 8 is a screen shot 800 illustrating the attachment of performance goals to multiple users, in accordance with one embodiment of the present invention.

DETAILED DESCRIPTION OF THE INVENTION

Reference will now be made in detail to the preferred embodiments of the present invention, a method and system for prescribing performance goals to users in a human resource environment, examples of which are illustrated in the accompanying drawings.

Accordingly, various embodiments of the present invention disclose a method and system for prescribing performance goals to targeted users in a human resource environment. Embodiments of the present invention enable administrators in an organization to ensure that the right groups of individuals get assigned, or prescribed the right performance goals. Further, embodiments of the present invention are able to automatically prescribe performance goals to targeted individuals. Moreover, this automatic prescription of performance goals is performed as individuals join, leave, and change jobs within the organization. As such, embodiments of the present invention are able to automatically prescribe performance goals to targeted users without requiring the administrators to update assignment of performance goals manually, thereby saving time and confusion.

Notation and Nomenclature

Figure 1:
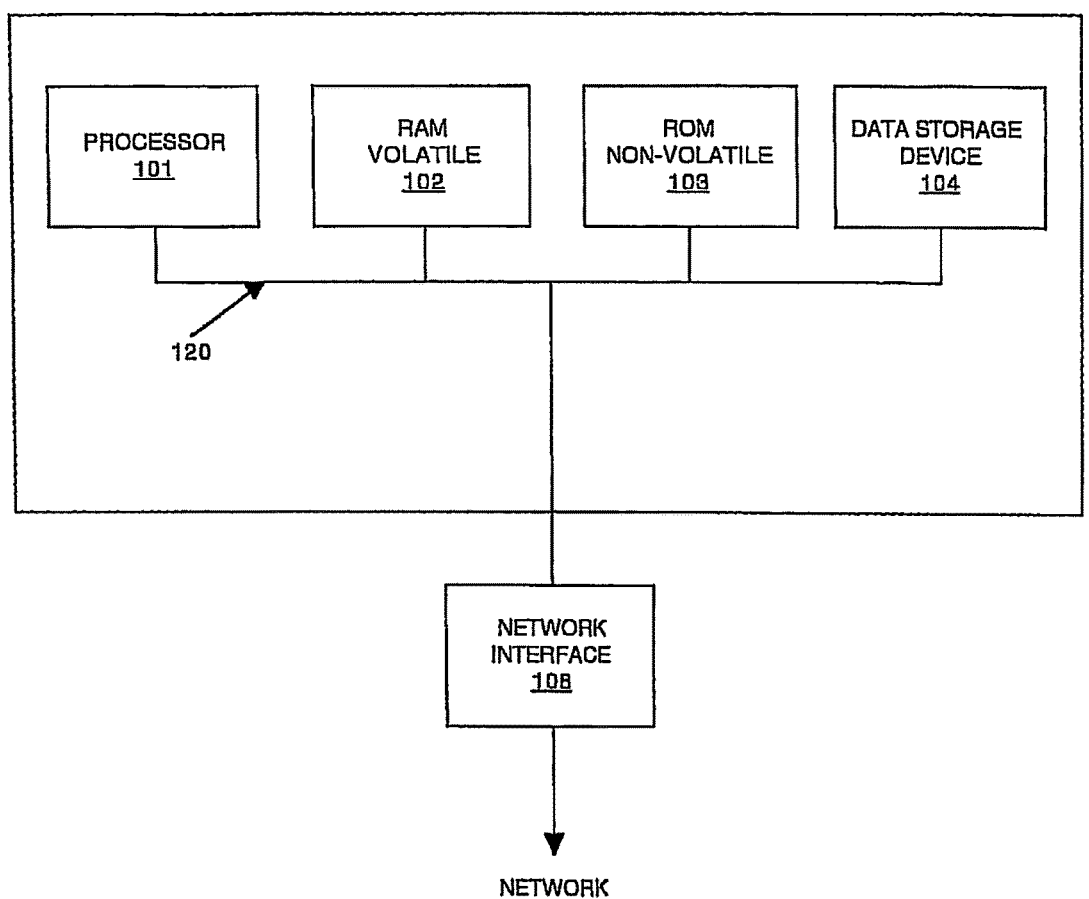
FIG. 1 is a block diagram of an electronic device that is capable of providing an interface with a back end server application through a messaging environment, in accordance with one embodiment of the present invention.

Referring now to FIG. 1, portions of the present invention are comprised of computer-readable and computer-executable instructions which reside, for example, in computer-readable media of an electronic system that are capable of accessing networked devices, such as, a server computer, mainframe, networked computer, workstation, hub, router, switch, firewall, access server, and the like. FIG. 1 is a block diagram of interior components of an exemplary electronic system 100, upon which embodiments of the present invention may be implemented.

Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., cache memory, memory card, hard drive, etc.) coupled with the bus 120 for storing information and instructions. Data storage device 104 is removable, in one embodiment. With reference still to FIG. 1, a network interface 108 (e.g., signal input/output device) is provided which is coupled to bus 120 for providing a communication link between electronic system 100 and a network environment. As such network interface 108 enables the central processor unit 101 to communicate with or monitor other electronic systems (e.g., networked devices) or coupled to a communication network.

Some portions of the detailed descriptions, which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "defining," "specifying;" "applying," "searching," "assigning," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Performance Goals

In one embodiment, organizations that have undertaken a formal business performance improvement effort require that management and employees define and align their performance goals that will be achieved over a particular period of time. These performance goals represent the key deliverables and accomplishments expected of the individual to perform their current job, roles or duties and can be driven by a number of different elements.

Performance goals can be ongoing ones that reflect the expected levels of performance for a particular role or organization. These performance goals typically contribute at some level to the success of a general business process. For instance, when productivity needs to be improved in a particular area of the organization, it is often these roles-based or process-oriented goals that are analyzed and adjusted to produce required results. Annual planning generally drives the key metrics and performance goals are cascaded through the organization, identifying the type of performance goal and expectation levels to which each individual will be held accountable.

In another embodiment, another driver for performance goals can be time-bound initiatives. These initiatives are often strategic in nature and are typically caused by external forces that cause a shift in the focus of the enterprise or organization. Examples of such initiatives might be a new product launch in order to gain or retain market share, implementation of new methodology, to improve quality in a short period of time, or a shift in the compensation and benefits offerings to be performance-driven vs. entitlement-based. These kinds of initiatives often occur mid-cycle, and thus can have an effect on the ongoing objectives of the organization and individual contributors. The present embodiment is capable of recognizing potential conflicts and to adjust existing expectations to account for these new goals.

In still another embodiment, goals can also reflect preparation of an individual to advance the individual's career, either through formalized succession planning, or resulting from personalized career development discussions with the individual's manager. These personal development goals and opportunities are essential in assuring retention of key contributors and provide opportunities to manage talent effectively.

Prescription Engine for Automatically Prescribing Performance Goals

Figure 2A:
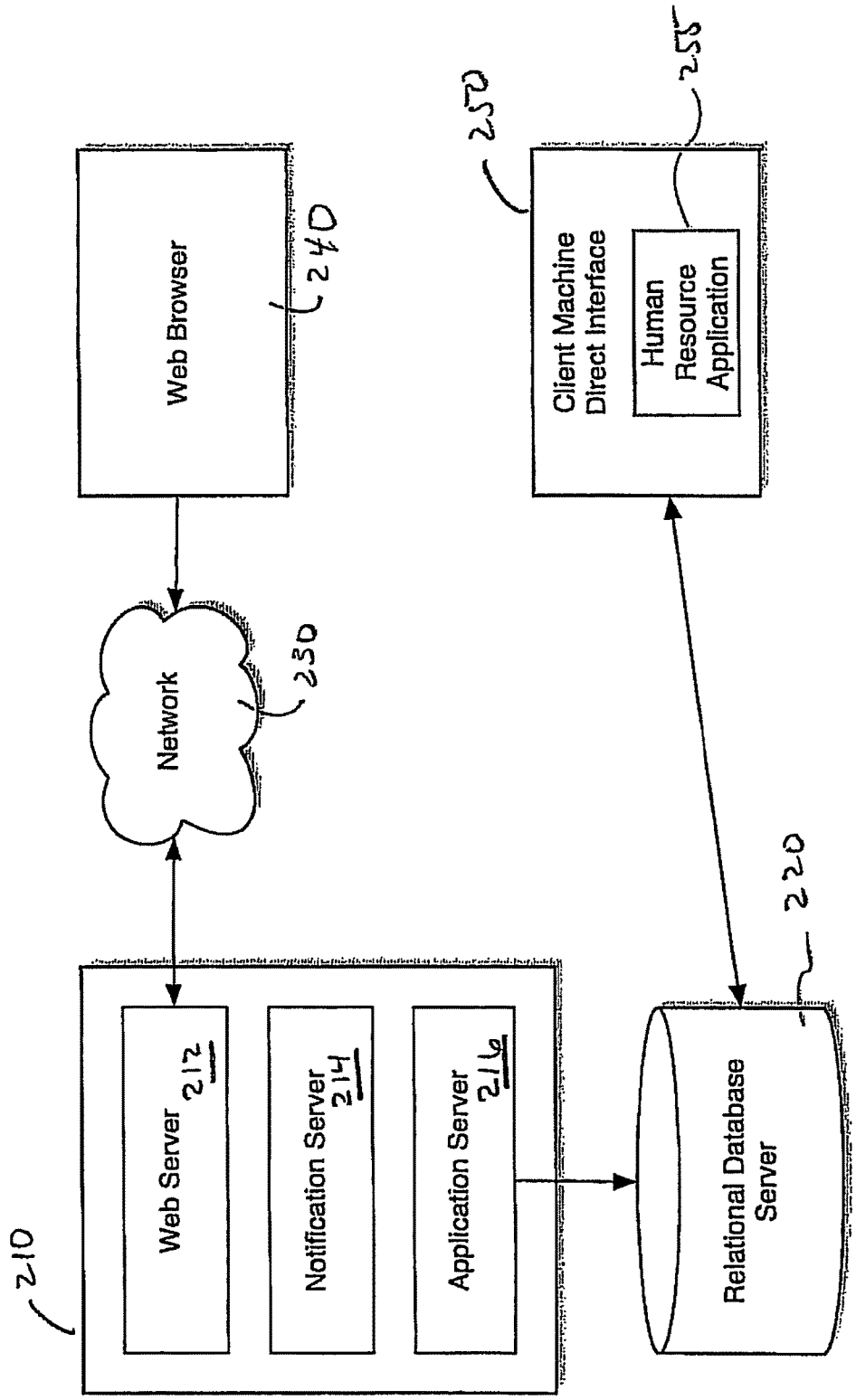
FIG. 2A is diagram illustrating a network that is capable of automatically prescribing learning requirements to users in an entity through a web interface or a direct interface with a prescription engine, in accordance with one embodiment of the present invention.

Now referring to FIG. 2A, a system 200A is shown illustrating a prescriptive engine 210 that is capable of automatically prescribing performance goals to users in a human resources environment, in accordance with one embodiment of the present invention. The prescriptive engine 210 of the present embodiment is able to ensure that the right groups of users are assigned the right performance goals. More specifically, the present embodiment is capable of prescribing or assigning performance goals automatically as users join, leave, and change jobs within an organization. The present embodiment can be performed without requiring human resource administrators to update these assignments manually, thereby saving time and confusion.

As shown in FIG. 2A, the system 200A illustrates two paths for utilizing the capabilities of a prescriptive engine. In one embodiment, the prescriptive engine 210 is accessed through a web browser 240 on the client machine. The prescriptive engine 210 is located on a back end server that is capable of automatically prescribing to targeted users particular performance goals.

In this case, the client machine, associated with a user, includes a web browser 240 that is able to use the communication network 230 for accessing the prescriptive engine 210. The communication network 230 (e.g., internet, intranet, etc.) facilitates communication between the prescriptive engine 210 and the client machine containing the web browser 240. More specifically, the browser 240 is able to retrieve the corresponding web page interface from the web server 212 that allows the user to interface with the back end server application supported by the application server 216.

The back end server containing the prescriptive engine 210 is able to provide centralized access to a back end server application supported by the application server 216 for a plurality of users, such as human resource administrators or employees of a corporation. In this way, multiple human resource administrators can develop performance goals to be targeted to particular users, and users of an entity can access a single back end server application for discovery of the automatic prescription of learning requirements, in accordance with one embodiment of the present invention.

The back end server application 220 provides management functionality through an integrated network-based platform to manage the learning of employees, content of databases, and performance of employees. In particular, human resources management applications are supported by the prescriptive engine 210, in one embodiment. The human resource management applications provide a platform to manage administrative costs in areas such as delivering training, tracking performance, invoicing, and other related professional services. The human resources management applications improve administrative efficiencies by assessing gaps in current skills and certifications of employees of a corporation, plan training to close those gaps, improve learning of employees through training offerings, and improve performance of the employees. In addition, the human resources management applications are able to help meet target performance goals in order to satisfy common expectations required of groups of users within an entity.

Specifically, the prescriptive engine 210 is capable of prescribing performance goals to users of an entity to ensure that management and individual users can define and align performance goals to be achieved over a particular period of time. These users are targeted by the human resource management application supported by the application server 216 by querying a relational database server 220 for selecting targeted users. As such, the prescriptive engine 210 is capable of automatically prescribing and tracking a set of performance goals prescribed to a targeted user or set of targeted users based on their roles, jobs, hire date, or other attributes.

For example, many organizations have common core values that are expected to be followed by groups of their people. These core values lead to common expectations required of groups of their people, and lead to individualized expectations required of individuals in the organization. For instance, the sales force in an organization may have target goals that describe an expectation to close a specific quantity of business in a period of time, make a certain number of contacts, or maintain a specific level of customer satisfaction. Embodiments of the present invention are able to provide a powerful and intuitive prescriptive engine to facilitate this process.

In another embodiment, the human resource management application 255, analogous to the applications supported by the prescriptive engine 210, is internally contained on a client machine 250. As a result, the client machine 250 internally provides automatic prescription of performance goals to users. That is, the client machine 250 is capable of directly interfacing with the relational database server 220 in order to provide automatic prescription of performance goals to users.

For example, a system administrator has direct access to the relational database server 220 and can execute the human resource management applications directly without a web interface to the back end server.

Figure 2B:
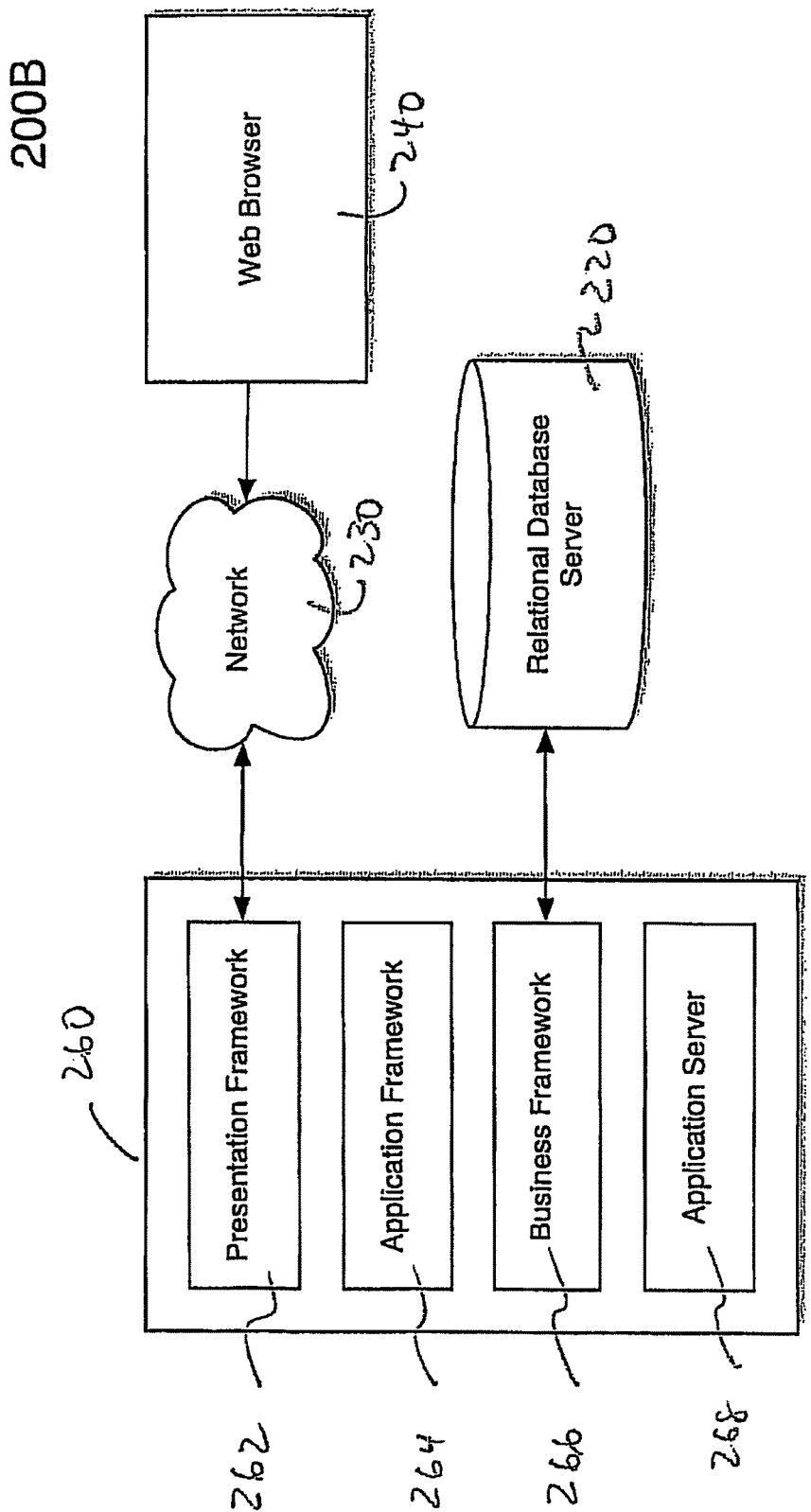
FIG. 2B is a diagram illustrating a network that is capable of automatically prescribing learning requirements to users in an entity through a web interface, in accordance with one embodiment of the present invention.

FIG. 2B is a diagram illustrating a system 200B that is capable of automatically prescribing performance goals to users in an entity through a web interface, in accordance with one embodiment of the present invention. The prescriptive engine 260 includes a presentation framework 262, an application framework 264, a business framework 266, and an application server 268. Also, the prescriptive engine 260 is capable of accessing the relational database 220 for selecting targeted users to which performance goals are prescribed.

For example, a web browser 240 accesses the prescriptive engine 260 through a network 230. Additionally, the web browser can access the network 230 through a wired or wireless connection, in accordance with embodiments of the present invention.

The presentation framework 262 of the prescription engine 260 provides the interface to the user. For example, in one embodiment, the presentation framework 262 includes a configurable user interface. The user interface includes various managers for supporting the user interface, including a menu manager, theme manager, label manager, desktop manager, etc.

Additionally, in another embodiment, the presentation framework 262 includes page generation functionality. For instance, the presentation framework 262 can include an extensible stylesheet language transformation (xslt) for converting extensible markup language (xml) to hypertext markup language (html) for screen display. Also, in another embodiment, widget libraries supporting extensible html or wireless markup language (wml) are included.

The application framework 264 of the prescription engine 260 includes security services and application services, in one embodiment. The security services automatically authenticate the user with the prescription engine 260 to provide to the user authorized access to the back end server application supported by the application server 268. In another embodiment, an authentication certificate is provided by the user. The application services provide managers supporting the prescription engine 260. For example, the application services include a domain manager, an audit manager, a custom field manager, a finder manager, a component manager, etc.

The business framework 266 of the presentation engine 260 provides a notification engine for notifying a user when a particular performance goal has been prescribed to the user. For example, the notification engine interfaces with web services, virtual learning environments (VLEs), e-mail servers, human resource centers and financial systems, etc. through various communication formats (e.g., simple object access protocol (SOAP), simple mail transfer protocol (SMTP), XML, etc.). Also, the business framework 266 includes an enterprise java beans (EJB) layer for interfacing with the back end application server 268. In addition, the business framework 266 layer provides access to the relational database server 220.

The prescription engine 260 also includes the application server 268 that supports the back end server application (e.g., human resource management application). The back end server application provides the capability for prescribing learning requirements to targeted users, in accordance with one embodiment of the present invention.

Method and System for Automatically Prescribing Performance Goals

Figure 3:
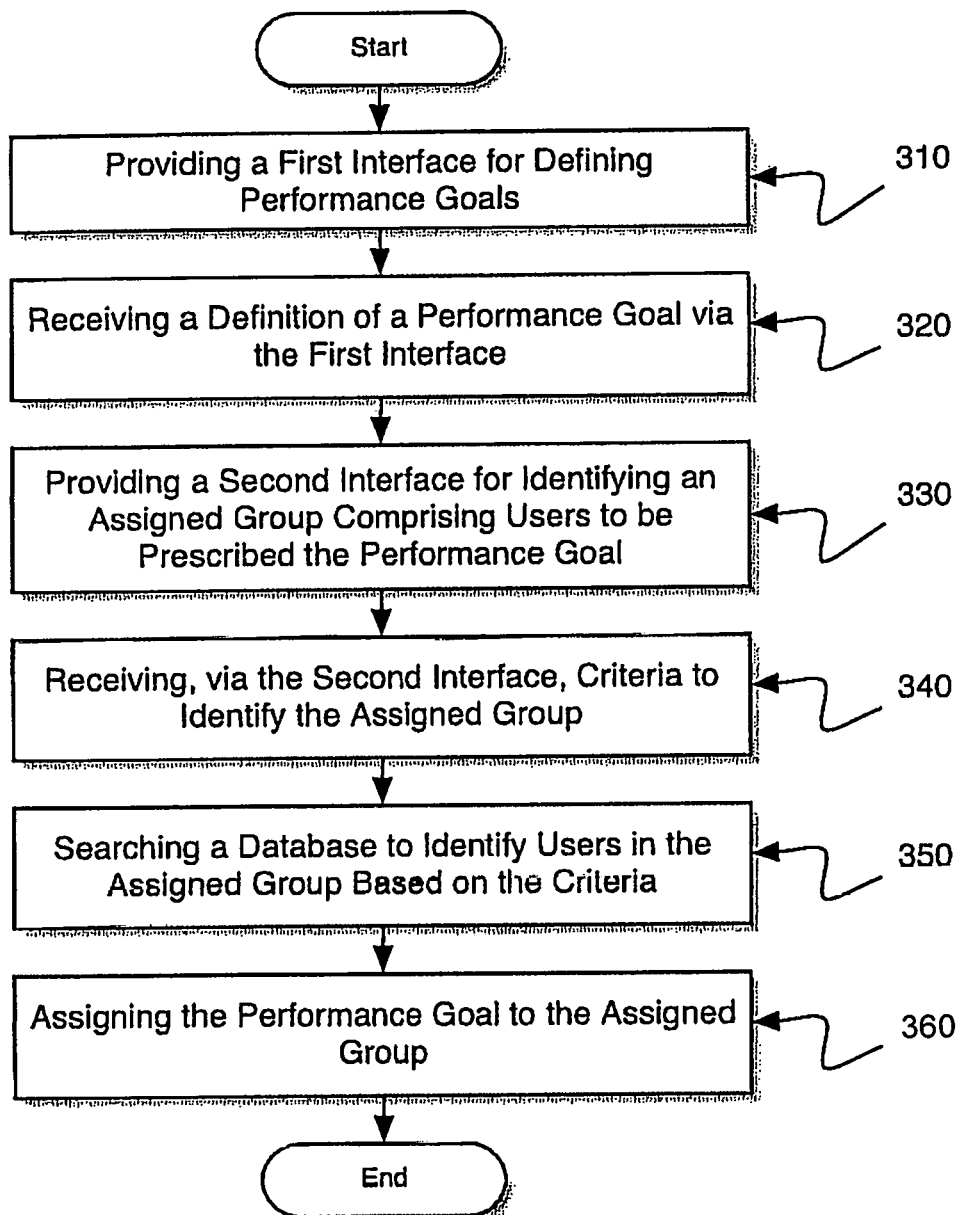
FIG. 3 is a flow chart illustrating steps in a computer implemented method for automatically prescribing performance goals to a group of targeted users through various interfaces, in accordance with one embodiment of the present invention.

Referring now to FIG. 3, a flow chart 300 is described illustrating steps in a computer implemented method for automatically prescribing performance goals to a group of targeted users, in accordance with one embodiment of the present invention. In one embodiment, the steps of FIG. 3 are implemented through a web based interface.

At 310, the present embodiment provides a first interface for defining performance goals. As such, for example, the present embodiment allows management and employees of a corporation to define and align goals that will be achieved over a particular period of time. As described previously, performance goals represent the key deliverables and accomplishments expected of a user to perform their current job roles, or duties. For instance, performance goals are based on productivity (e.g., expected or desired levels of performance), time-bound initiatives (e.g., date to new product launch), career orientation, etc.

In one embodiment, administrators and managers (e.g., human resource personnel) are provided with the appropriate access for creating the prescriptive rule, and its associated criteria and performance goals. These administrators and managers are provided with web based access to the prescription engine for defining and applying the prescriptive rule, in one embodiment. That is, a web interface is provided through a back end server application that allows a designer (e.g., human resources administrator) to develop and prescribe performance goals to individual users, or to groups of users, within an entity (e.g., organization).

At 320, the present embodiment receives a definition of a performance goal via the first interface. More specifically, through the first interface, a designer (e.g., a human resource administrator, manager, etc.) is able to construct a prescriptive rule, which defines a group of users and a set of performance goals that will be prescribed to them. A such, the prescriptive rule is created on the first interface and received by the first embodiment.

There is great flexibility in what can be assigned to the targeted users. For example, the designer (e.g., human resource administrator can assign individual goals in which each person receives an exact copy of the prescriptive goal, but can modify the goal definition as well as entering status and progress information specific to that individual. For instance, everyone in the sales role may receive a goal to "close $2,000,000 in business during fiscal 2005, but the goal owner or their manager may want to adjust this up or down depending on the size of their corresponding territory.

In another embodiment, a performance goal is unique to an individual. For instance, career path goals are typically unique to the individual. A web interface is provided to specify a particular performance goal is associated with an explicit user.

In another embodiment, the designer may assign shared goals, in which each person receives a copy of the goal. That is, all of the users identified in the assigned group have the same performance goal. With a shared goal, the definition is maintained centrally so if the goal requirements change then the designer can change it once and automatically update it for each user. For example, everyone in the sales role ay receive a goal to close $2,000,000 in business during fiscal 2004. The goal owner and the manager do not have the ability to change the requirement although they may enter a status and progress of their ability to reach the target. As such, half way through the year, if the goal seems overly ambitious or not ambitious enough, the administrator can revise it up or down and it immediately takes effect for everyone.

In one embodiment, the performance goal is assigned a status. This status can be maintained and viewed through a web interface so that the designer can indicate and determine a status associated with a performance goal. In one embodiment, the status is a draft status, which indicates the performance goal is still in the process of being defined. In another embodiment, the status is an active status, in which the performance goal has been fully defined and the prescriptive process will occur. In still another embodiment, the status is closed, in which the performance goal is no longer in use. Also, in one embodiment, the status is cancelled, in which the performance goal has been cancelled, and use of the performance goal cannot occur until it has been redefined.

At 330, the present embodiment provides a second interface for identifying an assigned group of users. The assigned group of users are prescribed the performance goal by the present embodiment. That is, the interface enables the designer to select and target a group of users that are located within a database (e.g., relational database) that is used, for example by an entity to store information about their employees.

At 340, the present embodiment receives, via the second interface, criteria to identify users within the assigned group. More specifically, through the second interface, the designer (e.g., a human resource administrator, manager, etc.) is able to further construct the prescriptive rule to specify the criteria to define the group of users to whom the performance goals are prescribed.

In one embodiment, the group of users are targeted from a plurality of users defined by attributes in a relational database. As such, the criteria specifies attributes that are common to each of the individuals in the group of user targeted by the prescriptive rule. In another embodiment, the group of user is selected explicitly. As a result, based on specific attributes about the targeted users, certain performance goals can be prescribed to the targeted users.

The set of common attributes that define the targeted group of users correspond to a set of corresponding fields used in the relational database, in one embodiment. That is, the set of fields can be used to identify the targeted group of users in the relational database. In addition, the relational database identifies individuals and users through unique, personal attributes associated with a plurality of fields.

In the present embodiment, there is great flexibility in what attributes are used to define the group of targeted users. For instance, the attributes can include but are not limited to the following: work location; job title; job type; what processes the user participates in; personal attributes, such as whether his particular competencies need to be improved; manager; alternate manager; role; organization; sub organization; secondary organization; status; location; domain; hire date range; competency; specific, in-progress, acquired, expired, or planned certification or curriculum that they hold; territory; employee type; employee status; any customized field; business unit; company; department; security domain; sub domain, team Membership; internal individual within the corporation or entity; external individual outside the corporation; both internal and external persons, competencies; skill levels, etc.

At 350, the present embodiment searches a database to identify users in the assigned group based on the criteria. More specifically, the present embodiment automatically applies, the prescriptive rule to the relational database to identify the group of targeted users. For instance, the present embodiment searches the relational database using the set of common attributes, or criteria, to populate or discover the group of targeted users. As such, the identified users in the assigned group can be prescribed the previously defined performance goals.

At 360, the present embodiment assigns or prescribes the performance goal to the users in the assigned group. That is, the present embodiment prescribes the defined performance goals to each of the populated and identified group of targeted users. Specifically, the prescriptive rule is activated for the prescription of the defined performance goals to the targeted users. In one embodiment, an interface is provided for activating the prescriptive rule, and the corresponding performance goal, in response to receiving an activation indicator.

In one embodiment, a listing of users in the assigned group is provided. The listing is created in response to a query for the listing.

In another embodiment, the list of actual members of the group of targeted users is automatically updated as new users meet the relevant criteria. In addition, old members will automatically drop out when they no longer satisfy the criteria. This is accomplished by searching the database again to re-define the assigned group. That is, the set of users in the assigned group is re-defined by again executing the prescriptive rule against the relational database.

In one embodiment, this re-definition is performed at predefined intervals, such that the database is searched at the predefined intervals. As such, the prescriptive rule is periodically applied to the relational database. In this manner, the targeted group of users is automatically updated at certain intervals. That is, the group of users is up-to-date, and the prescribed performance goals assigned to the group of targeted users are also up-to-date.

There is great flexibility in how frequently the system can update the assignments of performance goals in the prescriptive rule. This is important because some organizations and departments vary in their update times. For example, the present embodiment can be configured to run at the number of hourly, daily, weekly, or monthly intervals as desired, as soon as the prescriptive rule is enabled, and until it is disabled.

In another embodiment, the group of targeted users are notified of the prescription of the defined performance goals. That is, each of the group of targeted users are sent a message, for example, outlining the performance goal that has been prescribed or assigned. In one embodiment, the targeted users are automatically notified in response to receiving an activation indicator that activates the prescriptive rule.

In still another embodiment, a status of completion of each of the defined performance goals is provided. That is, the human resource administrator or manager is able to determine whether any or all of the group of targeted users have completed or satisfied the performance goals. For instance, in one embodiment, an interface is provided for defining metrics that measure successful completion of a particular performance goal.

In one embodiment, a time-bound action plan is provided to frame the set of performance goals that each individual is expected to complete. This action plan then becomes a contract of sorts between management and the employees or associates, or even beyond that to the extended enterprise, all of which can be individual contributors to the success of the organization. The action plan allows a common understanding of the levels of performance expected and commitment to delivering exemplary results over a period of time.

For instance, management commits to provide resources that enable success of these goals (capital, time, and sufficient training, to name a few) and the employee commits to address these goals with a conscious effort to complete them all in the period of time of the action plan. Each item within the plan has target dates, but also can be weighted in importance. As such, at any given time the employee should know which goal is most urgent and needs to be accomplished first.

In one embodiment, performance administrators can then generate personalized action plans for individuals in an organization, at a location, etc. as these groups of people are ready to begin their alignment exercise. Thereafter, individuals and their managers are able to complete an individual action plan (IAP) that can include individualized performance goals assigned to them directly, organizational goals, goals that will contribute to a process, goals that align to an initiative, as well as personal development goals held in the IAP.

Activation of the prescriptive rule and assignment of the performance goals to the individual action plan occurs in a pull model, in accordance with one embodiment of the present invention. That is, the present embodiment updates the user's action plan whenever the user is logging into the system or his manager looks at his action plan. This should ensure that the user or the manager gets the most up-dated view of the action plan.

In another embodiment, activation of the prescriptive rule and assignment of the performance goals to the individual action plan occurs in a synchronous model. The present embodiment updates the user's action plan instantaneously whenever any change to the prescription rule is implemented.

In still another embodiment, an interface is provided for de-composing the performance goal into milestones. These milestones represent specific deliverables and interventions that enable the users in the assigned group to succeed at completing the performance goal at expected levels of performance. Milestones can be planned out to ensure successful achievement of the goal. Some of these milestones are learning interventions, and developmental tasks needed to accomplish the performance goal. Still other milestones are task-like checkpoint items that can be used to measure progress and serve as job aids through the course of the goal execution.

As such, the user now has an arsenal of information through which the user can obtain the knowledge and skills necessary to execute his/her job effectively. Some of the items can be automatically added to the user's action plan through prescriptive learning, prescriptive performance goals, certification requirements, and other proactive, suggestive methods that are defined through the description of the person's job and role, the user's current levels of proficiencies in the competencies and skills needed. The result of this alignment process is a single list of activities, performance goals, learning requirements, job aids, and information for achieving results at the individual's fingertips.

Figure 4:
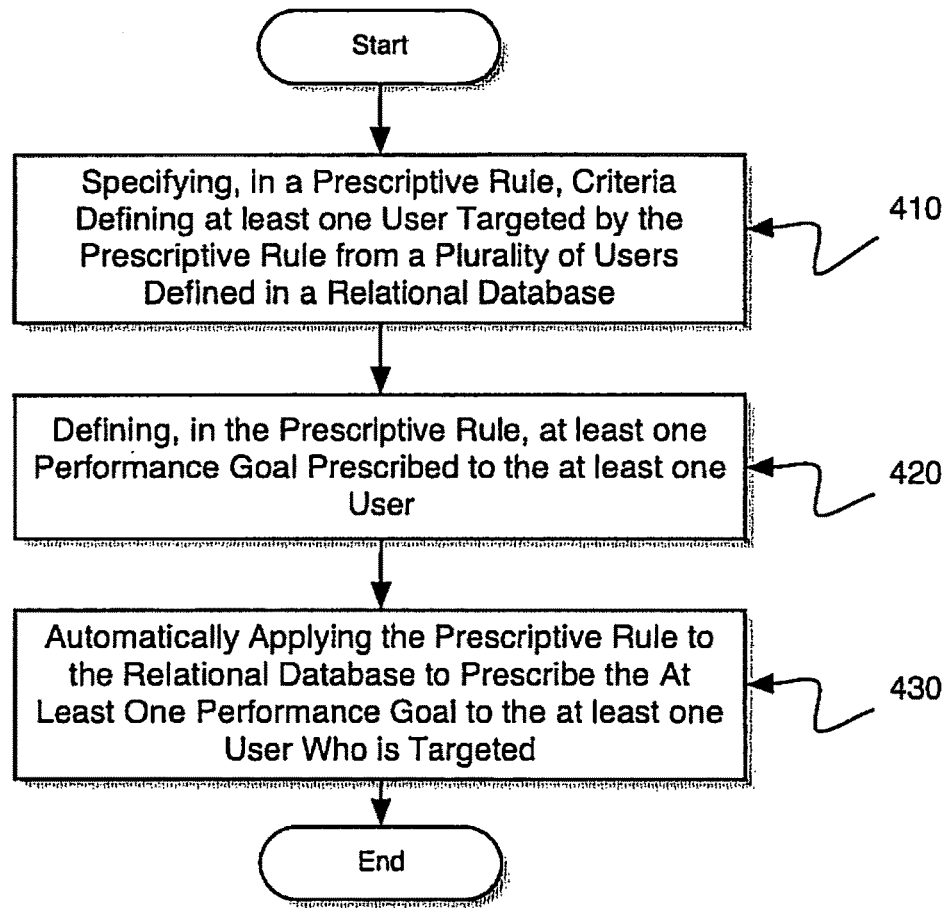
FIG. 4 is a flow chart illustrating steps in a computer implemented method for automatically prescribing performance goals to at least one targeted user, in accordance with one embodiment of the present invention.

Referring now to FIG. 4, a flow chart 400 is disclosed illustrating steps in a computer implemented method for automatically prescribing performance goals to individuals, in accordance with one embodiment of the present invention.

At 410, the present embodiment specifies in a prescriptive rule, criteria defining at least one user that is targeted by the prescriptive rule. The targeted users are selected from a plurality of users defined in a relational database. More specifically, the prescriptive rule defines a set of users and a set of performance goals that are assigned to the users. As such, the criteria defines at least one user who is targeted for the assignment of prescriptive performance goals.

In one embodiment, the criteria are defined as a set of attributes. The attributes are associated with and identify the user in a relational database. The relational database includes personal attributes that are associated with each of the plurality of users within the relational database.

At 420, the present embodiment, in the prescriptive rule, defines at least one performance goal prescribed to the targeted users. As described previously, performance goals represent the key deliverables and accomplishments expected of a user to perform their current job roles, or duties. For instance, performance goals are based on productivity (e.g., expected or desired levels of performance), time-bound initiatives (e.g., date to new product launch), career orientation, etc.

At 430, the present embodiment automatically applies the prescriptive rule to the relational database. In this way, the present embodiment is able to prescribe defined performance goals to the targeted users. For instance, the prescriptive rule is applied to automatically search the relational database for the users defined by the attributes associated with the criteria. In addition, the prescriptive rule is applied to assign the defined performance goals to the targeted user. That is, the user is presented with an action plan that includes the defined performance goals and any associated tasks that need to be completed in order to reach the performance goals. For instance, a task may include a learning requirement, such that the learning requirement enables the targeted user to succeed at completing the defined performance goals.

In another embodiment, a completion date can be defined and assigned for each of the performance goals that are prescribed to the group of targeted users. That is, for example, a performance goal associated with the prescriptive rule must be completed by the completion date.

FIGS. 5, 6, 7, and 8 are screen shots illustrating steps in the process of creating and applying a prescriptive rule for automatically prescribing performance goals to users, in accordance with embodiments of the present invention. The screen shots of FIGS. 5, 6, 7, and 8 are accessed through a web browser to a back end server application, for example by a human resources administrator or manager, and individual users, in accordance with one embodiment.

Turning now to FIG. 5, a screen shot 500 is shown illustrating an interface for defining a prescriptive rule that is used to define a set of targeted users and at least one performance goal that is prescribed to the targeted users. As shown in FIG. 5, the prescriptive engine is accessed through a web interface with a back end server having an address in block 510. Block 520 presents the purpose of the interface supported by the screen shot 500, which is to define the prescriptive rule.

Block 525 provides an overview of the various steps implemented for applying a prescriptive rule to targeted users contained within a relational database that includes a plurality of users. These steps include the following, as an example: 1) define prescriptive rule details; 2) define targeted user criteria; 3) attach performance goals; 4) preview selections; and 5) activate the prescriptive rule.

In block 530, the name of the rule is set. That is, the person or entity designing the prescriptive is able to assign a name to the rule for correlation with an underlying objective and the corresponding performance goals to be prescribed. As shown in block 530, the present prescriptive rule is called "performance goal 1."

In block 540, a textual description of the prescriptive rule is provided. For example, the description in FIG. 5 indicates that the targeted users must help to increase global sales by 20 percent.

In block 550, the domain of the prescriptive rule is defined. This is the domain of the employee, or targeted users. For instance, a domain may indicate a security level. Also, domains may indicate separations within a corporation, such as a sales domain, a technical domain, etc. In one embodiment, the domain set also includes all the subdomains. For example, in a corporation, the domain may include the world, or a continent, etc.

In block 560, the present embodiment provides for a definition for the update frequency when applying the prescriptive rule. That is, the prescriptive engine can set a frequency period for determining which users are targeted for prescription of the performance goals. FIG. 5 provides some exemplary periods, such as on an hourly basis, on a daily basis, or on a weekly basis. In FIG. 5, a weekly frequency is selected.

In blocks 570 and 575, custom fields are presented for application of the prescriptive rule. That is, corporations may track particular attributes of employees that are unique and important to that the corporation. The present embodiment is able to incorporate these custom attributes for application of a prescriptive rule. For example, a custom field may define the number of sales products a particular sales group is responsible for, and prescribe certain performance goals associated with those sales products.

FIG. 6 is a screen shot 600 illustrating the definition of criteria used for targeting users that are found in a relational database. The relational database, for example, stores personal and business information about employees of a corporation. This information is stored in fields that define attributes associated with each of the individual employees found in the relational database. As such, the screen shot 600 is used to define common attributes of the targeted users to whom performance goals are to be pushed. This is indicated in block 620, which presents the purpose of the interface supported by the screen shot 600, which is to define the targeted user criteria.

Block 610 indicates a new interface with the back end server is used for defining the user criteria. Block 525, as described previously, indicates the steps in the process for defining the prescriptive rule.

Block 630 indicates which common attributes are selected in defining the group of targeted users to whom the learning requirements are pushed. In one embodiment, the criteria is "ANDed" in that all targeted users must satisfy all of the criteria. For instance, the user information associated with performance goal 1 includes type 631, status 632, start date before 633, start date after 634, country 635, manager 636, domain 637, location 638, and other defined information 639 (e.g., the targeted user is an internal employee). These attributes may help select employees found within a particular sales group, for example. Checking blocks next to the individual criteria allows the prescriptive rule designer to further define that criteria in another screen.

Here following is a list of criteria that can be used for targeting users along with a brief definition of the criteria. The list is not intended to be exhaustive, and can include other criteria defined for selecting targeted users. A "domain" defines the domain of the employee or client that is targeted within the corporation. That is, a corporation may be defined by certain predefined domains. A "location" indicates the location of the employee or client. The "territory" indicates the territory of the employee or external client as defined by the corporation. Also, specifying a territory implies all sub-territories. The criteria, "country" indicates the country associated with the employee or client, such as the country where a home address is situated. A "job title" criteria indicates the job title listed on the employee or external client record. The criteria, "job type" indicates the job type listed on the employee or client record. Job types may indicate if the user is an engineer, project coordinator, etc. The criteria, "role," indicates the role listed on the employee or client record. These roles further define the strategic placement of the employee or external client within a corporation. The roles further define the job type, and a job type may include multiple roles. The criteria, "certification-planned," indicates the planned status for a certification. Any employee in the 'Planned' status for a certification would be selected, for example. The criteria, "certification-in-progress," indicates the in-progress status for a certification. That is, the employee is currently obtaining the certification. Any employee in the 'In Progress' status for a certification would be selected, for example. The criteria, "certification-acquired," indicates that the certification has been acquired. The criteria, "certification-expired," indicates that the certificate has expired. The criteria, "employee type," indicates the employee type field from the employee record. The criteria, "employee status," indicates the employee status field from the employee record. There can be custom employee fields. The criteria, "Started On Date Between," indicates the range of dates for when starting in a corporation. The criteria, "Manager," indicates the manger of the employee or client. The criteria, "Business Unit," indicates the business unit of the corporation for the employee. For example, business units may include an accounting unit, an administration unit, an engineering unit, etc. Also, a "Company," criteria can be selected for corporations that include many companies. Also, the particular "department" within a corporation can be selected.

In addition, block 640 indicates the job and role criteria for selecting the particular jobs and roles of the targeted users. Checking the blocks next to the job or role will bring up an additional screen for further defining the job and role of the targeted user. For instance, the job block 647 is invoked allowing the designer to further define the job type information in block 649. That is, the targeted users hold sales positions in the sales groups, as defined by the job type. As such, the employees in sales are prescribed the performance goal of achieving a 20 percent increase in global sales of products.

FIG. 7 is an exemplary action plan 700 illustrating the attachment of the performance goals to an action plan associated with a targeted user, in accordance with one embodiment of the present invention. The action plan 700 defines the deliverables or milestones expected of the individual. These milestones each have target start and end dates, so the view of these deliverables can always be represented in terms of whether the items are overdue, should be completed by the end of the next week, month or by the end of the action plan. The user essentially uses this list as the launching point for goal progress reporting and execution. By offering this view in the action plan 700, the user can better view planned learning, competencies, developmental tasks and other milestones that link back to performance goals in one single list.

As shown in FIG. 7, the prescribed goals to a targeted user include "goal 1," "goal 2," and "goal 3." Embodiments of the present invention are well suited to listing however many goals are prescribed to a user. Each of the columns in the action plan illustrated in the action plan 700 define particular milestones or information associated with each of the goals. For instance, in column 710, a weight is provided for the goals in congregate. As such, a weight that indicates the relative importance of the goal in relation to other prescribed goals can be defined as a value between 0 and 100, in one embodiment.

In column 720 of the action plan, a source of the goal is provided. That is, the originating designer of the corresponding performance goal is provided. For instance, for goal 1, the manager above the user associated with action plan 700 developed and prescribed the goal. For goal 3, the user personally developed and prescribed the goal.

In column 730, the target start date of the performance goal is provided. That is, the start date indicates when any corresponding action taken for satisfying the performance goal is expected to begin. For instance, for goal 1, actions to be taken can be expected to begin in June 2005.

In column 740, the target end date of the performance goal is provided. That is, the end date indicates when any corresponding action must be completed for satisfying the corresponding performance goal. For instance, for goal 1, actions to be taken to satisfy goal 1 must be completed before December 2005.

In column 750, an actual end date is provided. That is, the actual date of completion of the actions taken in relation to the corresponding goal is provided. For instance, for goal 1, all actions were completed by Oct. 31, 2005.

In column 760, a status of each of the performance goals is provided. The status of the goals indicates to what degree the actions needed to be taken in relation to a corresponding goal have been completed. That is, after a performance goal has been defined and activated, the status in the action plan 700 gives a progress report of corresponding performance goals. For instance, for goal 1, the status is one hundred percent complete. Also, for goal 2 the user is on track to satisfy goal 2 by the target end date. For goal 3, the user needs to give some attention to satisfying goal 3.

FIG. 8 is a screen shot 800 illustrating the attachment of performance goals to multiple users, in accordance with one embodiment of the present invention. FIG. 8 illustrates a view of the attachment of performance goals to multiple users, in accordance with one embodiment of the present invention. This is beneficial at a managerial level, and can be used to track performance of a particular group of individuals in achieving and completing performance goals. The screen shot 800 defines the deliverables or milestones expected of the particular individuals. These milestones each have target start and end dates, so the view of these deliverables can always be represented in terms of whether the items are overdue, should be completed by the end of the next week, month or by the end of the action plan.

At column 810, a list of users or assignees are provided. Three different individual users are listed, as follows: "Ginny Grant," "Brook Manville," and "Simon Jonas." It is appreciated that the present embodiment can display one or more users in the screen shot 800.

At column 820, a goal statement is provided for each of the users. That is, for each user, a defined goal is listed. For instance, Ginny Grant must create two white papers, At column 830, the type of goal is also provided. Various types can be listed. For instance, a revenue type and a process type are shown in FIG. 8.

At column 840, the target start date of the goal listed in the goal statement column 820 is provided. The start date indicates when any corresponding action taken for satisfying the performance goal is expected to begin. For instance, for the goal associated with Ginny Grant (e.g., write two white papers), actions to be taken can be expected to begin in June 2005.

In column 850, the target end date of the performance goal is provided. That is, the end date indicates when any corresponding action must be completed for satisfying the corresponding performance goal. For instance, for the goal associated with Ginny Grant (e.g., to write two white papers) actions to be taken to satisfy goal 1 must be completed before December 2005.

In column 860, an actual end date is provided. That is, the actual date of completion of the actions taken in relation to the corresponding goal is provided. For instance, for the goal associated with Ginny Grant (e.g., write two white papers), all actions were completed by Oct. 31, 2005.

In column 870, a status of each of the performance goals is provided. The status of the goals indicates to what degree the actions needed to be taken in relation to a corresponding goal have been completed. That is, after a performance goal has been defined and activated, the status in the screen shot 800 gives a progress report of corresponding performance goals. For instance, for the goal associated with Ginny Grant (e.g., write two white papers), the status is one hundred percent complete.

Figure 9:
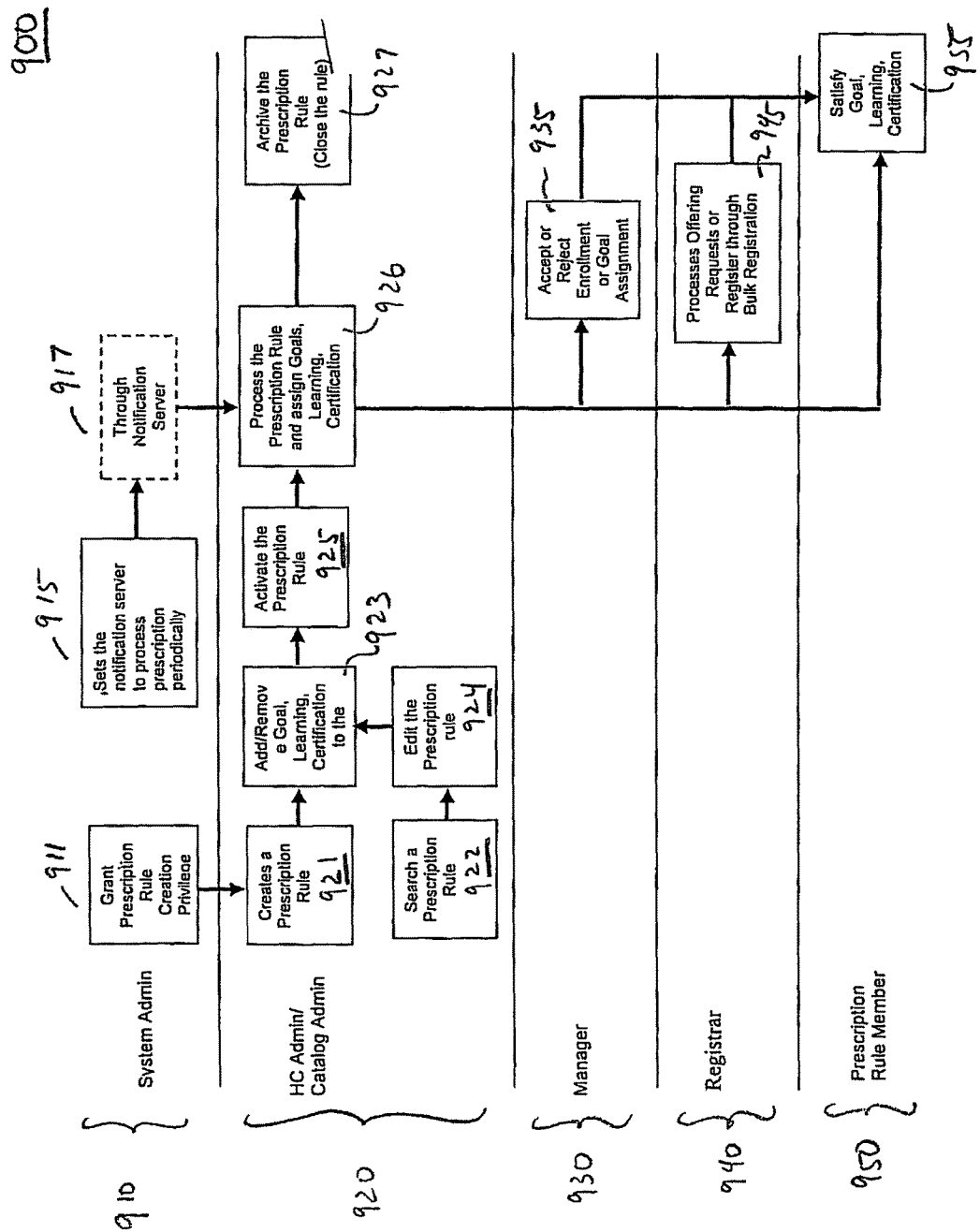
FIG. 9 is a swim lane diagram 900 illustrating the process for automatically prescribing performance goals to one or more targeted users, in accordance with one embodiment of the present invention.

FIG. 9 is a swim lane diagram 900 illustrating the process for automatically prescribing performance goals to one or more targeted users, in accordance with one embodiment of the present invention. As shown in FIG. 9, at block 911, the system administrator 910 grants the privileges for creating and editing prescription rules and processing them to certain roles in the system. At block 915, the present embodiment checks for the rules that need to be processed as per the frequency set for each rule and processes them accordingly. This is accomplished through the notification server in block 917.

From there, a human resources administrator 920 (e.g., human capital administrator or catalog administrator) creates the rules as per the definition to form a group of people as specified, in block 921. The administrator will create the learning/goals/certifications as required or choose from the existing catalog and associate it with the rule, in block 923. Additionally, the present embodiment allows the human resource administrator to search a prescription rule in block 922, and edit the selected prescription rule in block 924. In block 925, the present embodiment allows the prescription rule to be activated. For instance, after the prescription definition is set the present embodiment processes the rule regularly either through the notification server, or through the prescription engine. As such, the prescription rule is applied to a relational database and processed to locate the targeted users in order to assign performance goals or learning requirements, as necessary, in block 926. Thereafter, the present embodiment archives the prescription rule in block 927.

Once the prescription rule is processed, the learning/goals/certifications are pushed to the user's profile. At block 935, their managers 930 approve the requests as and wherever needed. For example, the manager 930 is able to approve course registration, and when performance goals are set, the manager can revise these performance goals to align them with revised goal targets.

At block 945, the present embodiment is able to automatically register the user for required courses or curricula. For instance, the present embodiment can parse through all such offering requests created, or learning requirements prescribed, and register the learners to the appropriate existing offering or create a new offering for the group of people. In addition, the present embodiment is able to bulk register a group of targeted users.

At block 955, the prescription rule member 950 is the user with performance goals, learning requirements, and certifications prescribed to them as per the demands set for their positions and roles in the organization. The users 950 need to complete the requirements in the set time frame to be able to achieve its target. If their role or position changes, new requirements are pushed down to them and old ones are removed as necessary.

Accordingly, various embodiments of the present invention disclose a method and system for prescribing performance goals to targeted users in a human resource environment. Embodiments of the present invention are capable of enables administrators in an organization to ensure that the right groups of individuals get assigned, or prescribed the right performance goals. Further, embodiments of the present invention are able to automatically prescribe performance goals to targeted individuals. Moreover, this automatic prescription of performance goals is performed as individuals join, leave, and change jobs within the organization. As such, embodiments of the present invention are able to automatically prescribe performance goals to targeted users without requiring the administrators to update assignment of performance goals manually, thereby saving time and confusion.

While the methods of embodiments illustrated in flow charts 300 and 400 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for automatically prescribing learning requirements to targeted users are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A system including computer-readable medium having computer-readable instructions embodied therein for causing a plurality of computer devices to perform a method comprising:
    a relational database server including data attributes describing an organization and each of a plurality of users associated with said organization;
    a backend server including a prescriptive engine, said backend server is coupled to the relational database;
    a plurality of client devices, each client device associated with one or more of said plurality of users, each client device including a web browser, each web browser associated with a user connects to said prescriptive engine; and
    said prescriptive engine generates a plurality of prescriptive rules including,
        defining, through a first web page interface, details concerning each given prescriptive rule including a given performance goal; and
        after said defining details concerning each given prescriptive rule, defining, through a second web page interface, criteria for targeting one or more users that said given prescriptive rule applies to;
    said prescriptive engine activates one or more prescriptive rules based on input from a human resource user to a human resource management application, activating a given prescriptive rule includes,
        selecting one or more particular users by querying said relational database based upon said activated prescriptive rule; and
        notifying said one or more particular users by pushing an action plan for said corresponding one or more particular performance goals of said activated prescriptive rule to a corresponding web browser on a corresponding client device when a respective particular user logs onto said prescriptive engine;
    said prescriptive engine processes said activated prescriptive rule, and a manager user and an employee user collaborate to align said performance goal of said prescriptive rule through respective web browsers of respective client devices;
    said prescriptive engine automatically drops a particular user that no longer meets said criteria of said activated prescriptive rule;
    said prescriptive engine automatically adds a particular user that meets said criteria of said activated prescriptive rule; and
    said prescriptive engine automatically updates each said activated prescriptive rule periodically, in response to pulling a change of data in said relational database, or input from a user.

2. The system of claim 1, wherein said data attributes are selected from a group consisting of: a domain; a location; a territory; a job title; a job type; a role; a planned certification; an in-progress certification; an acquired certification; an expired certification; an employee type; an employee status; a customized field; a start on date between a date range; a manager; a business unit; a company; a department; an organization; a sub-organization; a security domain; a sub-domain; a team membership; a competency; and a skill level.

3. The system of claim 1, wherein said human resources management applications perform a variety of functions selected from a group consisting of: manage administrative costs, assessing gaps in current skills and certifications of employees, plan training to close learning gaps, improve learning of employees through training offerings, improve performance of employees, and meet target performance goals.

4. The system of claim 1, wherein defining details concerning said prescriptive rule further includes a learning requirement.

5. The system of claim 1, wherein defining details concerning a given prescriptive rule further includes assigning a completion date to satisfy said performance goal.

6. The system of claim 5, wherein defining details concerning a given prescriptive rule further includes defining metrics to measure successful completion of said performance goal by said completion date.

7. The system of claim 1, wherein each web browser associated with a user connects to said prescriptive engine: using a communication network.

8. The system of claim 7, wherein the communication network comprises the internet.

* * * * *